DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 1, 1973

910 O.G. 7

T910,004

BLUE ANTHRAQUINONE DYES FOR RADIOGRAPHIC FILM BASE

Robert F. Coles, Lake Elmo, Minn., assignor to Minnesota Mining and Manufacturing Company, St. Paul, Minn.

Filed Aug. 18, 1972, Ser. No. 281,835
Int. Cl. G03c *1/84*
U.S. Cl. 96—87 R
No Drawing. 7 Pages Specification

Heat stable, blue, anthraquinone dyes which are suitable for inclusion in polyester film base include 1,4-bis-(2,6-diisopropylanilino) anthraquinone and 1,4-bis(2-ethyl-6-methylanilino) anthraquinone.